United States Patent
Ranganathan

(10) Patent No.: US 7,424,610 B2
(45) Date of Patent: Sep. 9, 2008

(54) REMOTE PROVISIONING OF SECURE SYSTEMS FOR MANDATORY CONTROL

(75) Inventor: Kumar Ranganathan, Portland, OR (US)

(73) Assignee: Intel Corporation, Santa Clara, CA (US)

(*) Notice: Subject to any disclaimer, the term of this patent is extended or adjusted under 35 U.S.C. 154(b) by 787 days.

(21) Appl. No.: 10/745,729

(22) Filed: Dec. 23, 2003

(65) Prior Publication Data
US 2005/0138423 A1 Jun. 23, 2005

(51) Int. Cl.
*H04L 9/00* (2006.01)
*G06F 12/14* (2006.01)

(52) U.S. Cl. ............... 713/164; 713/166; 726/22

(58) Field of Classification Search ............... None
See application file for complete search history.

(56) References Cited

U.S. PATENT DOCUMENTS 5,692,124 A * 11/1997 Holden et al. ............ 726/2
6,289,462 B1 * 9/2001 McNabb et al. .......... 726/21

* cited by examiner

*Primary Examiner*—Nasser Moazzami
*Assistant Examiner*—Brandon S Hoffman
(74) *Attorney, Agent, or Firm*—Blakely, Sokoloff, Taylor & Zafman LLP

(57) ABSTRACT

A method, apparatus, and system are provided for remotely provisioning an operating system for implementing mandatory access controls on a computer system. According to one embodiment, platform credentials may be associated with a hardware trusted computing base (TCB) of a target computer system, and a mandatory access control (MAC)-based operating system may be remotely provisioned on the target computer system.

20 Claims, 6 Drawing Sheets

REMOTE PROVISIONING OF SECURE SYSTEMS FOR MANDATORY CONTROL

BACKGROUND OF THE INVENTION

1. Field of the Invention

This invention relates generally to provisioning of secure systems that implement mandatory controls. More particularly, an embodiment of the present invention relates to remote provisioning of such systems.

2. Description of Related Art

Modern computer systems and networks (system) need to reliably and securely manage information. These systems secure information by using access controls that are typically implemented by operating systems, virtual machine monitors, or other system software.

An operating system or virtual machine manager (VMM) used to implement mandatory access controls (MAC) supports information compartmentalization by denying access to information based upon a site-mandated security policy. The operating system in a MAC system ensures that a user cannot delegate his right to access an information object on that system to another user if the site-mandated policy dictates that such access be denied. Typically, site-mandated MAC policy specifies that access be either granted or denied based upon the specific role the user assumes, or the clearance level the user has. MAC-based operating systems can be typically implemented in a number of following ways: via multi-level secure (MLS) labels, via support for roles, or via domain type enforcement (DTE) techniques. The SELinux operating system, for example, supports MLS, role-based and DTE-based techniques for mandatory access controls.

In contrast, conventional operating systems implement discretionary access controls (DAC) that allow a user to delegate his access rights to other users. In such systems, information cannot be compartmentalized in accordance with a site-mandated security policy because a user with rights to an information object can delegate those rights to other users at their own discretion. Traditional varieties of Windows and UNIX, for example, are operating systems that support DAC.

FIG. 1 is a block diagram illustrating a prior art provisioning and security system. Although mandatory access control (MAC)-based operating systems, such as the MAC-based operating system 104, cannot be modified or patched at runtime without sufficient clearance, traditionally computer systems 102 having MAC-based operating systems 104 rely upon physical security 116 for their operation. Furthermore, information, including security labels associated with information objects (e.g., labeled objects 112), boot image of the operating system (e.g., operating system image 108), and security policy files 110, in the storage 106 has to be physically secured.

Security assurance refers to grounds for or level of confidence that a computer system meets its security objectives according to the accepted security policy. The security assurance of computer system 102 is highly dependent upon the MAC-based operating system 104 being provisioned correctly with a high integrity operating system image 108 and policy files 110 in a physically secure facility 100 (e.g., a locked room) by a trusted site administrator 114. Furthermore, without the physical security 100, an attacker could use low-level disk tools to subvert the MAC security policy, resulting in a loss of the security assurance of the computer system 102.

Conventional physical security 100 is necessary every time a MAC-based operating system 104 is installed and booted on a computer system, such as the computer system 102. Without such physical security 100, legitimate users of the computer system 102 and other networked systems or machines (not shown) interacting with the computer system 102 often incorrectly assume that the MAC-based operating system 104 on the computer system 102 is correctly enforcing the necessary confidentiality and security policy. Furthermore, conventional methods of provisioning of the MAC-based operating system 104 do not scale, as they depend on the need for physical security 100. In particular, the need for physical security 100 makes it impossible to remotely provision these computer systems, such as the computer system 102, within a potentially hostile physical environment.

Examples of various access-based security and control systems include Access360 by International Business Machines (IBM®), mainframe access control system, Windows Active Directory® by Microsoft® Corporation is an access control or management system which is known to coordinate Windows® access control lists. Other examples included DAC account permissions, MAC systems, role-based access control (RBAC), which is no more than a pre-packed form of MAC, and a lattice-based access control (LBAC), which is a combination of RBAC and DAC.

BRIEF DESCRIPTION OF THE DRAWINGS

The appended claims set forth the features of the present invention with particularity. The embodiments of the present invention, together with its advantages, may be best understood from the following detailed description taken in conjunction with the accompanying drawings of which:

DETAILED DESCRIPTION

Figure 1:
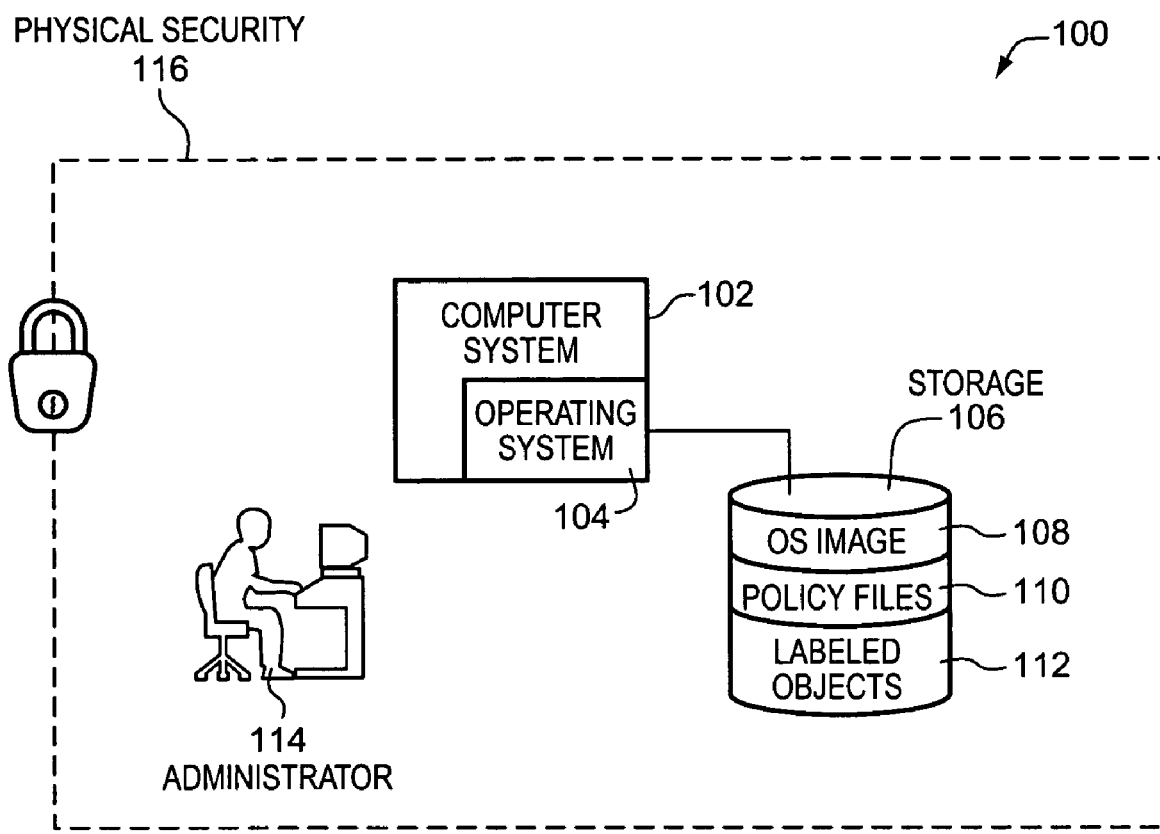
FIG. 1 is a block diagram illustrating a prior art provisioning and security system.

A method and apparatus are described for remotely provisioning an operating system or virtual machine manager (VMM) used for implementing mandatory controls on trustworthy hardware of a computer system. Embodiments of the present invention provide for trustworthy and high-assurance provisioning of computer systems that implement mandatory controls in environments where physical security cannot be guaranteed.

According to one embodiment, a remote computer system may be used to remotely provision or install a mandatory access control (MAC)-based operating system on a target computer system. The provisioning computer system may be coupled with the target computer system via a network. According to one embodiment, the target computer system may include a hardware trusted computing base (TCB) having various hardware components, such as a processor, a trusted platform module (TPM), and a chipset to, directly or indirectly, couple the processor with the TPM. According to one embodiment, the provisioning computer system may also be used to remotely provision a MAC-based VMM on the target computer system.

According to one embodiment, the trustworthiness of the TCB on a target computer system may be established prior to remotely provisioning the MAC-based operating system on the target computer system. According to one embodiment, various platform credentials may be associated with the hardware TCB on the target computer system. These platform credentials may include a key pair having a private key and a public key for secure attestation by the hardware TCB.

According to one embodiment, the hardware TCB on the target system may be used to measure the identity of the MAC-based operating system to help establish trustworthiness of the MAC-based operating system. The results of such measurement may be compiled in a measurement report that may be submitted to the provisioning computer system using a cryptographically secure protocol. This process is referred to as attestation.

According to one embodiment, the hardware TCB may serve as the root of trust for the target computer system and for the MAC-based operating system. According to another embodiment, when remotely provisioning a MAC-based VMM, as opposed to a MAC-based operating system, the MAC-based VMM may be measured by the hardware TCB that subsequently attests to the measured MAC-based VMM rather than to the measured MAC-based operating system.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
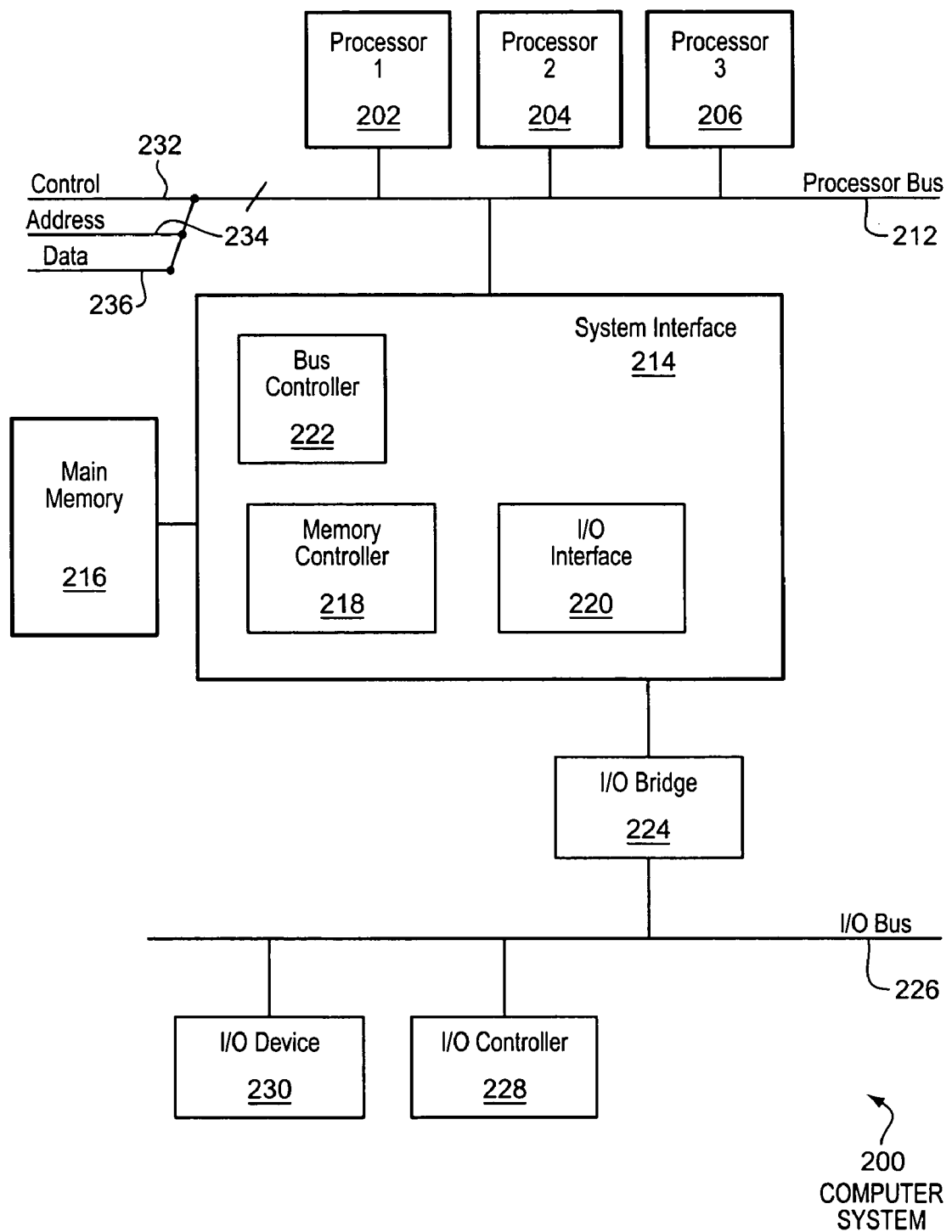
FIG. 2 is a block diagram illustrating an embodiment of a computer system.

FIG. 2 is a block diagram illustrating an embodiment of a computer system. The computer system (system) includes one or more processors 202-206. The processors 202-206 may include one or more single-threaded or multi-threaded processors. A typical multi-threaded processor may include multiple threads or logical processors, and may be capable of processing multiple instruction sequences concurrently using its multiple threads. Processors 202-206 may also include one or more internal levels of cache (not shown) and a bus controller or bus interface unit to direct interaction with the processor bus 212.

Processor bus 212, also known as the host bus or the front side bus, may be used to couple the processors 202-206 with the system interface 214. Processor bus 212 may include a control bus 232, an address bus 234, and a data bus 236. The control bus 232, the address bus 234, and the data bus 236 may be multidrop bi-directional buses, e.g., connected to three or more bus agents, as opposed to a point-to-point bus, which may be connected only between two bus agents.

System interface 214 (or chipset) may be connected to the processor bus 212 to interface other components of the system 200 with the processor bus 212. For example, system interface 214 may include a memory controller 218 for interfacing a main memory 216 with the processor bus 212. The main memory 216 typically includes one or more memory cards and a control circuit (not shown). System interface 214 may also include an input/output (I/O) interface 220 to interface one or more I/O bridges or I/O devices with the processor bus 212. For example, as illustrated, the I/O interface 220 may interface an I/O bridge 224 with the processor bus 212. I/O bridge 224 may operate as a bus bridge to interface between the system interface 214 and an I/O bus 226. One or more I/O controllers and/or I/O devices may be connected with the I/O bus 226, such as I/O controller 228 and I/O device 230, as illustrated. I/O bus 226 may include a peripheral component interconnect (PCI) bus or other type of I/O bus.

System 200 may include a dynamic storage device, referred to as main memory 216, or a random access memory (RAM) or other devices coupled to the processor bus 212 for storing information and instructions to be executed by the processors 202-206. Main memory 216 also may be used for storing temporary variables or other intermediate information during execution of instructions by the processors 202-206. System 200 may include a read only memory (ROM) and/or other static storage device coupled to the processor bus 212 for storing static information and instructions for the processors 202-206.

Main memory 216 or dynamic storage device may include a magnetic disk or an optical disc for storing information and instructions. I/O device 230 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 230 may also include an input device (not shown), such as an alphanumeric input device, including alphanumeric and other keys for communicating information and/or command selections to the processors 202-206. Another type of user input device includes cursor control, such as a mouse, a trackball, or cursor direction keys for communicating direction information and command selections to the processors 202-206 and for controlling cursor movement on the display device.

System 200 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 200 may be coupled with a number of clients and/or servers via a conventional network infrastructure, such as a company's Intranet and/or the Internet, for example.

It is appreciated that a lesser or more equipped system than the example described above may be desirable for certain implementations. Therefore, the configuration of system 200 may vary from implementation to implementation depending upon numerous factors, such as price constraints, performance requirements, technological improvements, and/or other circumstances.

It should be noted that, while the embodiments described herein may be performed under the control of a programmed processor, such as processors 202-206, in alternative embodiments, the embodiments may be fully or partially implemented by any programmable or hardcoded logic, such as field programmable gate arrays (FPGAs), transistor transistor logic (TTL), or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 3:
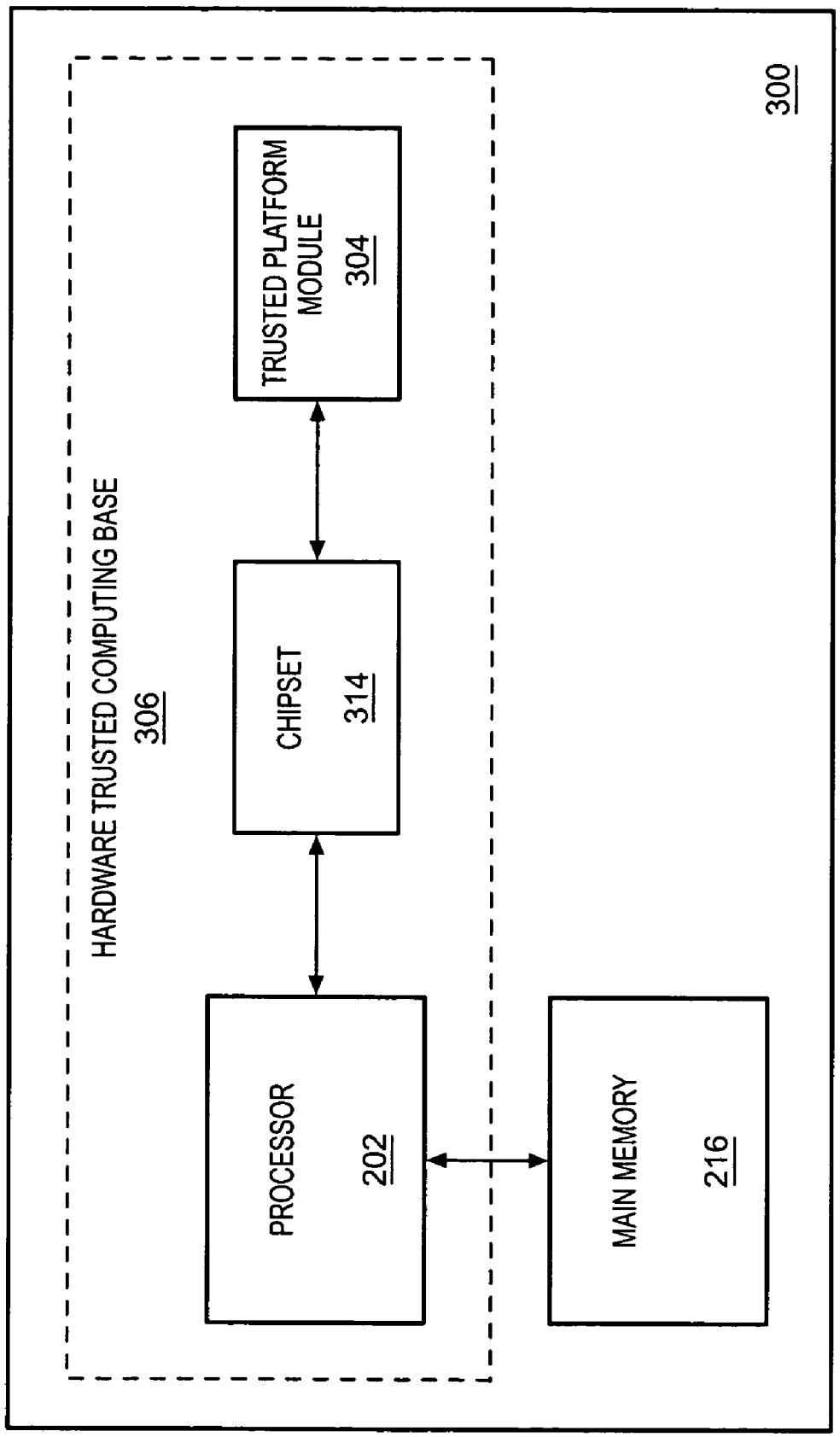
FIG. 3 is a block diagram illustrating an embodiment of a trusted computing base of a computer system.

FIG. 3 is a block diagram illustrating an embodiment of a trusted computing base of a computer system. As illustrated, a trusted computer system or device (system) 300 may include a hardware trusted computing base (TCB) 306 based on a secure hardware device, such as a trusted platform module (TPM) 304, a processor 202 having special security extensions that provides a tamper-resistant facility for software measurement and related facilities for address space isolation, and a system interface or chipset, such as the security-enhanced chipset 314, to provide special security capabilities including the ability to selectively protect main memory 216 from, for example, DMA-based input/output (I/O).

The trusted platform module (TPM) 304 may include a secure co-processor to provide a unique, hardware-based machine identity, tamper-resistant secure storage for secret keys, tamper-resistant storage of measured values, and tamper-resistant cryptographic algorithms that support attestation protocols. TPM 304 may also provide digital signature operations in order to perform attestation to a remote computer system. Collectively, these hardware modules may be referred to as the hardware TCB 306.

According to one embodiment, the processor 202 may be used to measure the booted software in a tamper-resistant manner, and the TPM 304 may be utilized as a secure co-processor to provide tamper-resistant secure storage for confidential information, tamper-resistant storage for previously measured values, and tamper-resistant cryptographic algorithms to support attestation protocols. For example, the tamper-resistant processor 202 may be used to measure software that may be loaded on the system 300. The measured value may be a cryptographic hash of the software image and may represent the integrity of the measured software. According to one embodiment, the measured value may be subsequently signed by a tamper-resistant co-processor (e.g., the TPM 304) using a key that may be contained and hidden in the TCB 306 and more particularly, for example, in the TPM 304.

The process of attestation may be used for having the signed measured value reported to a remote system via, for example, a cryptographic protocol. The remote system may ascertain the trustworthiness of the measured software and may make a trust decision based on the trustworthiness of information reported by the hardware TCB 306 of the measured system 300.

According to one embodiment, the TPM 304 may hold previously measured information about the software and hardware environment of the system 300. Each of the TPMs, such as the TPM 304, may have a unique endorsement key (EK) to be used to establish an identity for the system 300. TPM 304 may have a cryptographic execution engine to support an attestation protocol using the measured values and the system identity. Furthermore, the TPM 304 may have a secure storage facility in which applications may store keys and other secrets. These secrets may be released to the applications if, for example, they present the right credentials. TPM 304 may not raise the assurance level of the system 300 as a whole on its own, because it may not directly measure software; however, the task may be performed by the processor 202 and the result may be stored in the TPM 304. According to one embodiment, the trustworthiness of the system 300 may be anchored in the hardware TCB 306.

According to one embodiment, the hardware TCB 306 may be manufactured by a computer system or device manufacturer so that it may perform the functions necessary and conform to the operations of the protocols to maintain the security assurance described herein.

Figure 4:
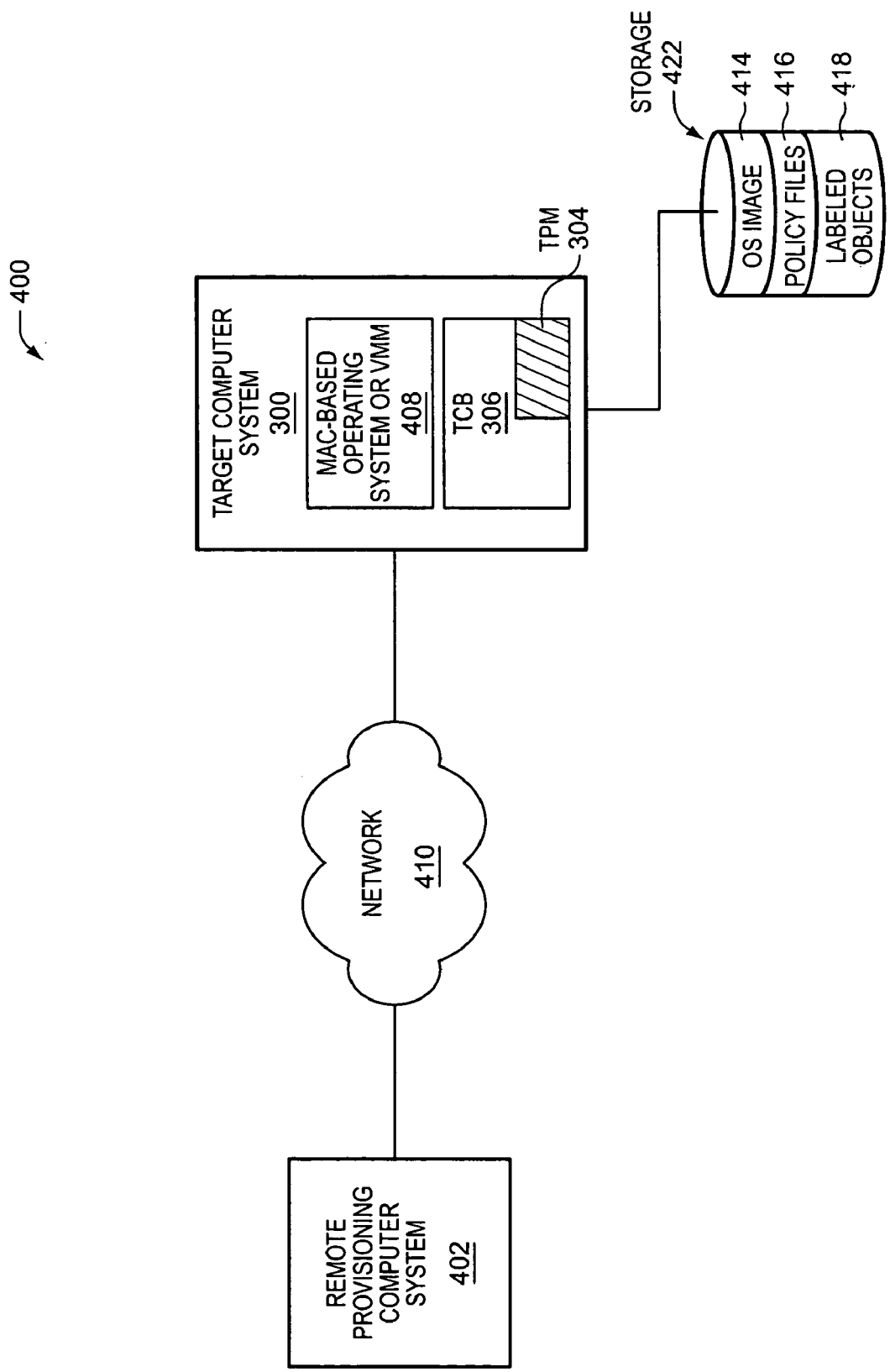
FIG. 4 is a block diagram illustrating an embodiment of a remotely provisioned computer system.

FIG. 4 is a block diagram illustrating an embodiment of a remotely provisioned computer system. According to one embodiment, an operating system 408 on a measured system may encapsulate all the relevant access control mechanisms, such as mandatory access control. The MAC-based operating 408 may, in turn, enforce a specific security policy that may be expressed within one or more policy files 416 on the system 300. This security policy may be applied to the labeled objects 418 on the system 300.

On a computer system, such as the target computer system (target system) 300, that supports a hardware TCB 306, a MAC-based operating system 408 and related security policy files 416 may be remotely provisioned (e.g., installed and configured) over a network 410. According to one embodiment, the hash representing a good value of the operating system image 414 and the hash representing a specific security policy 416 may be certified in advance by an authority (e.g., the organization that is performing the remote provisioning) in the form of a digital certificate. This certificate may then be stored in advance on a provisioning system, such as the remote provisioning computer system (provisioning system) 402.

To remotely provision the MAC-based operating system 408, the target hardware TCB 306 of the trusted system 300 may be initially configured once with platform credentials (e.g., a private/public key pair to be used for future attestation by the TCB 306) by a trusted site system administrator. These platform credentials may establish the target hardware TCB 306 as being trustworthy. According to one embodiment, following the trusted computing group (TCG) model, these platform credentials may take the form of a signed certificate for public/private key pair called an aliased identification key (AIK). In this certificate, the public half of the AIK may be signed by a trusted third party (TTP) to certify its association with a trustworthy hardware platform. According to one embodiment, the private AIK may be stored at the TPM 304 of the hardware TCB 306.

According to one embodiment, the private half of the AIK may be stored in the TPM 304 within the hardware TCB 306 and may not leave the TPM 304. The AIKs may be generated so that they may be probabilistically unique (e.g., no two systems may have the likelihood of having the same AIK). Once the TPM 304 on the hardware TCB 306 may be provisioned with the AIK, the trustworthy MAC-based operating system 408 may be remotely provisioned any number of times with a relatively high level of security assurance without the need for physical security or further physical intervention.

On the target computer system 300, on which the MAC-based operating system 408 may be remotely provisioned (e.g. via a network boot), the hardware TCB 306 may measure the identity of the MAC-based operating system 408 (represented as a cryptographic hash of the operating system image 414, according to one embodiment). Using a cryptographically secure attestation protocol, the hardware TCB 306 on the provisioned system 300 may subsequently report this measurement via a digital signature (created using the AIK) to the provisioning system 402.

The provisioning system 402 may compare the attested value against the value in the digital certificate credential. Based on the results of the comparison, according to one embodiment, the provisioning system 402 may then decide whether the hardware on the provisioned or target system 300 is trustworthy and whether the newly provisioned MAC-based operating system software of the MAC-based operating system 408 is also trustworthy. If the newly provisioned MAC-based operating system 408 is deemed trustworthy, it may, in turn, attest to the hash image of its security policy files 416 and labeled objects 418 to the provisioning system 402. By comparing the attested values of the security policy files 416 and object labels 418 against known good values, the provisioning system 402 may determine whether the correct security policy is in place. According to one embodiment, this check may provide a mechanism for the remote provisioning system 402 to validate its belief that the provisioned MAC-based operating system 408 is trustworthy.

According to one embodiment, if the check is successful, the provisioning system 402 may conclude with a high degree of confidence (limited only by the assurance level of the hardware TCB 306) that the MAC-based operating system 408 on the target system 300 is the one expected, and that the MAC-based operating system 408 may enforce mandatory controls on information flow, consistent with the security policy as expressed in the policy files 416 of the provisioned or target system 300. According to one embodiment, by having the hardware TCB 306 on the target system 300 become the root of trust for the target system 300 and the MAC-based operating system 408 (via the hardware based measurement and the binding of the AIK to the hardware TCB 306), the need for physical security may be eliminated.

A secure and trusted MAC-based operating system 408 (e.g., SELinux) may be securely launched (e.g., booted) on the target system 300. In this secure launch process, the hardware TCB 306 may measure the MAC-based operating system 408 and store the measured value in the TPM 304. According to one embodiment, during the boot process of the operating system 408, a previously booted operating system may itself initiate a secure launch procedure causing a secure reboot. The secure launch procedure may result in a trustworthy hardware-based integrity measurement of the operating system image 414 by microcode in the hardware platform, the hardware TCB 306 of the target system 300.

Once the operating system 408 is successfully launched, the operating system 408 may also measure the MAC-related integrity policy files 416 and labeled objects 418 (e.g., labels associated with the persistent objects) during the boot process. The operating system image 414, the policy files 416, and the labeled objects 418 may reside at a storage device 422, directly or indirectly, coupled with the target system 300 or may reside at another computer system. After the measured MAC-based operating system 408 has been booted, it may attest to the remote provisioning system 402 by signing the hash of the measured values using the AIK stored in the TPM 304. The MAC-based operating system 408 may be securely and remotely booted over a network 410. The network may be a wired network or a wireless network including a Local Area Network (LAN), a Wide Area Network (WAN), an intranet, the Internet, and the like.

According to one embodiment, a virtual machine manager (VMM), as opposed to the MAC-based operating system 408, implementing mandatory access control may also be remotely provisioned at a computer system (e.g., target system 300) over a network (e.g., network 410). According to one embodiment, the MAC-based VMM may be measured by the hardware TCB (e.g., TCB 306), having the attestation protocol attesting to the measured MAC-based VMM rather than to the measured MAC-based operating system 408.

Once booted, the MAC-based operating system 408 may be designed to be resistant to any unauthorized modifications depending on various factors, such as system necessities and requirements, individual and organizational goals, and as determined by a system administrator. The MAC-based operating system 408 having been verifiably and securely launched with integrity may be assumed to correctly enforce mandatory access controls on the provisioned target system 300.

Figure 5:
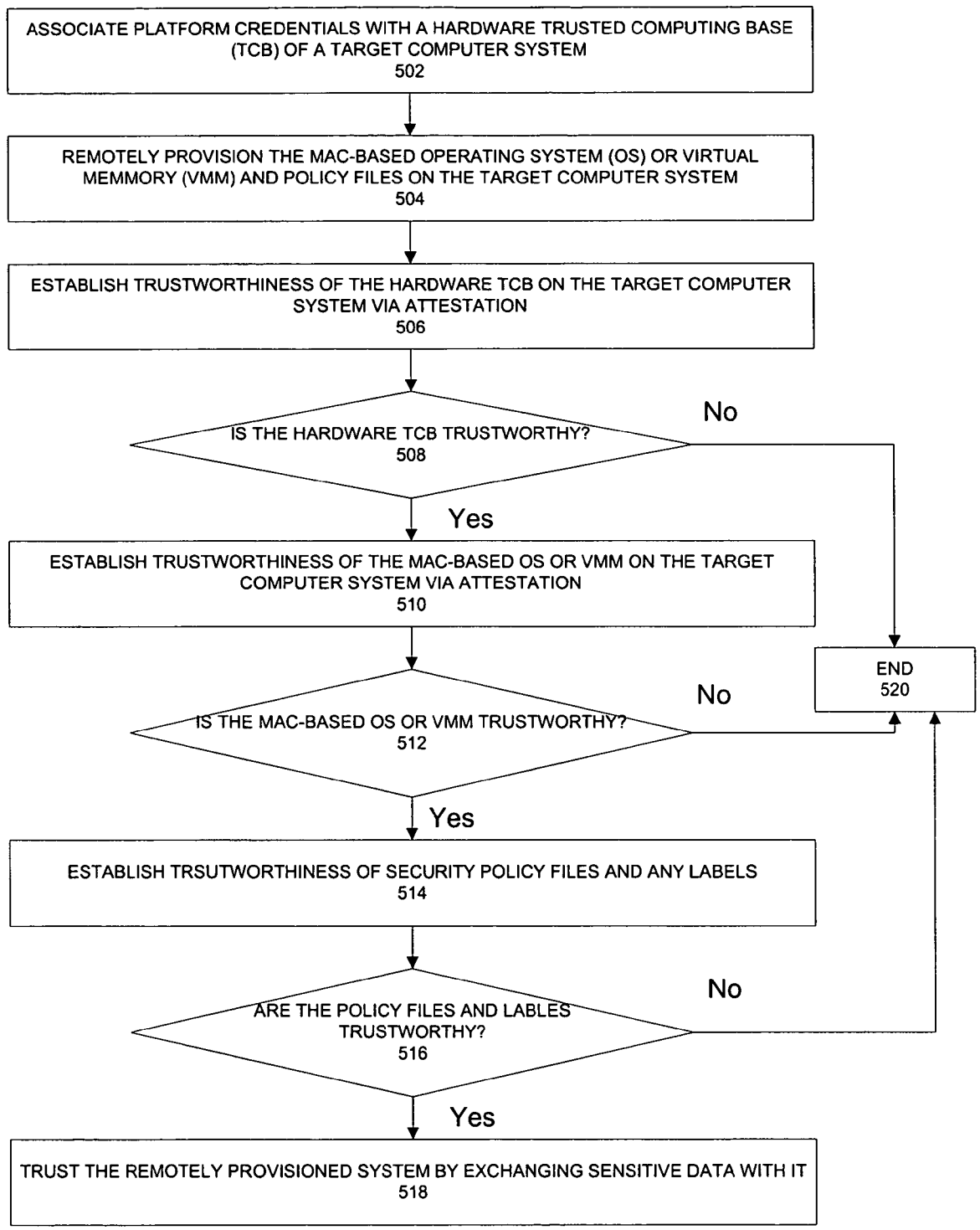
FIG. 5 is a flow diagram illustrating an embodiment of a process for remotely provisioning a computer system.

FIG. 5 is a flow diagram illustrating an embodiment of a process for remotely provisioning a computer system. First, according to one embodiment, various platform credentials may be associated with a hardware trusted computing base (TCB) of a target computer system (target system) at processing block 502. The platform credentials may be used and associated with the hardware TCB to establish the trustworthiness of the hardware TCB. According to one embodiment, platform credentials may include a private-public key pair having a private key and a public key for attestation by the hardware TCB. The private key may include a private aliased identification key (AIK), and the public key may include a public AIK. The private AIK may be stored at a trusted platform module (TPM) of the hardware TCB, and the public AIK may be signed by a trusted third party (TTP) to certify that it is associated with the TPM.

At processing block 504, a MAC-based operating system (or a MAC-based virtual machine manager (VMM)) and security policy files may be remotely provisioned. This may be achieved by using a remotely initiated secure boot process. The security policy file may be remotely transferred to the target system.

At processing block 506, the trustworthiness of the hardware TCB may be established via attestation. The hardware TCB may serve as a root of trust for the target system and for the MAC-based operating system (or the MAC-based VMM) to be provisioned on the target system. At decision block 508, the trustworthiness of the hardware TCB may be determined. If the hardware TCB is not regarded as trustworthy, the process may end at processing block 520.

If the hardware TCB is trustworthy, the trustworthiness of the MAC-based operating system (or the MAC-based VMM) may be established at processing block 510. According to one embodiment, the MAC-based operating system may be measured for its trustworthiness and identity using the hardware TCB. The results of such measurement may then be compiled into a cryptographically signed measurement report, rooted in the TPM of the hardware TCB (using the previously provisioned AIK as at processing block 502). This signed value may be submitted by the target system to the remote provisioning computer system (provisioning system).

At decision block 512, the provisioning system may compare the measured report against an expected known good value to determine whether the MAC-based operating system (or the MAC-based VMM) is trustworthy. If the match fails and the trustworthiness is not established, the process may end at processing block 520. If the match succeeds, the MAC-based operating system (or MAC-based VMM) may be considered the one that was expected and its integrity and operation may be trusted. According to one embodiment, processing blocks 506-512 may be combined into a single processing block and may be performed as such.

At processing block 514, the MAC-based operating system (or MAC-based VMM) may measure the security policy files and any security labels associated with data objects and may submit the measured value to the remote provisioning system via a cryptographically signed attestation protocol. At decision block 516, the provisioning system may compare the measured value of the policy file and labels against known good values to determine whether the security policy files and labels are trustworthy. If the match fails and the trustworthiness is not established, the process may end at processing block 520. If the match succeeds, the security policy files may be considered correct and the data objects may be regarded as correctly labeled. Such may imply that the newly provisioned MAC-based operating system (or the MAC-based VMM) is capable of enforcing the correct security policy on the correct data objects. At processing block 518, the provisioning system may exchange sensitive information with the target system because the target system may now be trusted.

Figure 6:
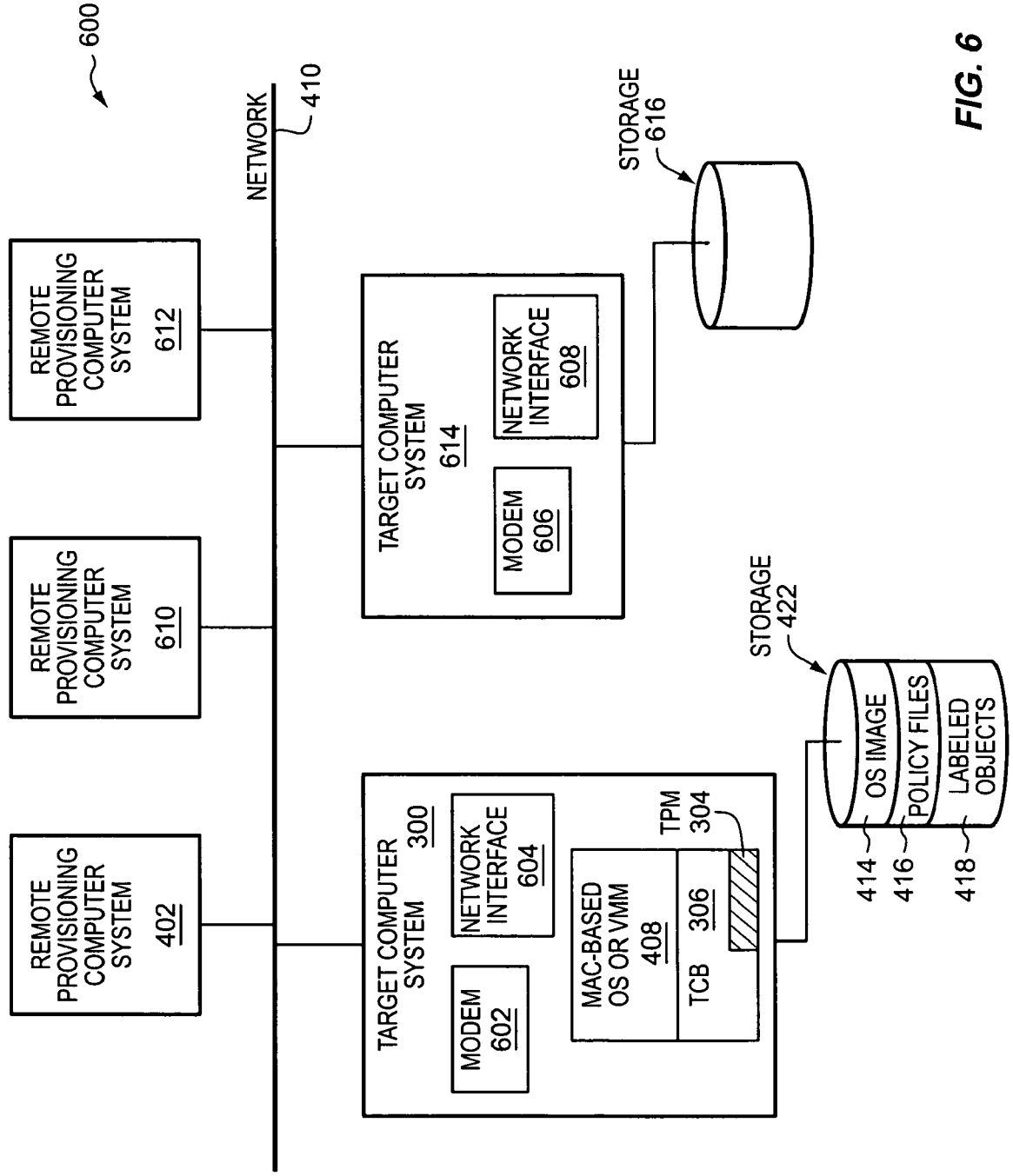
FIG. 6 is a block diagram illustrating an embodiment of a network.

FIG. 6 is a block diagram illustrating an embodiment of a network. According to one embodiment, a computer system or physical machine (target system) 300, 614 may include a single system, or multiple systems coupled with each other via a network 410 and/or via other physical and/or logical links. The network 410 may be wired or wireless and may include a wide are network, a local area network, the Internet, and the like. Furthermore, target systems 300, 614 may include a processor (not shown) including one or more single-threaded processors or multi-threaded processors.

According to one embodiment, target systems (e.g., target system 300) may include a hardware platform or device, such as the trusted platform module (TPM) 304 and a TPM-based hardware trusted computing base (TCB) 306. The target system 300 may also include a mandatory access control (MAC)-based operating system (or MAC-based VMM) 408. The target system 300 may include a modem 602 and/or a network interface 604, and the like. Similarly, the target system 614 may include a modem 606 and/or a network interface 608, and the like. The modems 602, 606 and/or the network interfaces 604, 608 may be used to couple or communicatively connect the target systems 300, 614 with other remote computer machines or systems, such as the remote provisioning computer systems (provisioning systems) 402 and 610-612 via a network 410. The MAC-based operating systems, such as MAC-based operating system 408, and/or MAC-based virtual machine manager (VMM) may be remotely provisioned on the target systems 300, 614 via the network 410 by one or more of provisioning systems 402, 610, and 612.

The network 410 may include a physical network, a logical network, a wide area network (WAN), a local area network (LAN), an intranet, the Internet, and the like. As will be appreciated by one skilled in the art, any communication via the network 410 may include the use of a variety of wired and/or wireless carrier and protocols, including radio frequency (RF), satellite, microwave, Bluetooth, optical, infrared, cable, laser, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:

associating platform credentials to a hardware trusted computing base (TCB) of a target computer system to establish trustworthiness of the hardware TCB, wherein the platform credentials include a private-public key pair having a private key and a public key to perform secure attestation by the hardware TCB;

remotely provisioning security policy files and a mandatory access control (MAC)-based operating system on the target computer system, wherein the remotely provisioning of the security policy files and the MAC-based operating system is performed via a remotely-initiated secure boot process, wherein the remotely provisioning of the security policy files includes remotely transferring the security policy files to the target computer system; and establishing trustworthiness of the MAC-based operating system by measuring identity of the MAC-based operating system via the hardware TCB, and compiling results of the identity measurement into a first cryptographically signed measurement report that is rooted in a trusted platform module (TPM) of the hardware TCB, and submitting the first signed report to a remote provisioning computer system via a cryptographically-secured attestation protocol.

2. The method of claim 1, wherein the trustworthiness including the hardware TCB serving as a root of trust for the MAC-based operating system, and having security assurance and trust and security properties including at least one of the following: tamper-resistant secure storage, tamper-resistant software measurement, and tamper-resistant attestation of previously measured values via tamper-resistant signature algorithms.

3. The method of claim 1, wherein the remote provisioning of the MAC-based operating system includes remotely installing the MAC-based operating system on the target computer system via a network.

4. The method of claim 3, wherein the network comprises at least one of the following: a wide area network, a local area network, an intranet, and the Internet.

5. The method of claim 1, wherein the private key includes a private aliased identification key (AIK) having signed certificate for the private key, and the public key includes a public AIK having signed certificate for the public key.

6. The method of claim 1, wherein the operation of associates platform credentials comprises:
storing the private AIK at the TPM of the hardware TCB; and
obtaining the public AIK from a trusted third party (TTP) to certify association of the public AIK with the TPM.

7. The method of claim 1, further comprising:
comparing the first measurement report received by the remote provisioning computer system with an expected hash value corresponding to a known good image of the MAC-based operating system to validate that the MAC-based operating system is capable of enforcing a security policy in a secure or insecure physical environment.

8. The method of claim 7, further comprising:
submitting a second measurement report to the remote provisioning computer system, the second measurement report having information associated with security policy files and labels of the MAC-based operating system; and
comparing the second measurement report received by the remote provisioning computer system with an expected value corresponding to a known good image of the security policy files and the sensitivity labels to validate that the MAC-based operating is capable of enforcing the correct security policy on labeled data objects.

9. The method of claim 1, wherein the hardware TCB serves as a root of trust for the MAC-based operating system, the hardware TCB having trust and security properties including at least one of the following: tamper-resistant secure storage, tamper-resistant software measurement, and tamper-resistant attestation of previously measured values via tamper-resistant signature algorithms.

10. The method of claim 1, further comprises remotely provisioning a MAC-based virtual machine manager (VMM) on the target computer system.

11. An apparatus, comprising
a target computer system having a hardware trusted computing base (TCB) including a plurality of hardware components including a processor and a trusted platform module (TPM), the target computer system further having platform credentials associated with the hardware TCB to establish trustworthiness of the hardware TCB, wherein the platform credentials include a private-public key pair having a private key and a public key to perform secure attestation by the hardware TCB, the TCB hardware is further to establish trustworthiness of a mandatory access control (MAC)-based operating system at the target computer system by measuring identity of the MAC-based operating system, and compile results of the identity measurement into a first cryptographically signed measurement report that is rooted in the trusted platform module (TPM) of the hardware TCB, and submit the first signed report to a remote provisioning computer system via a cryptographically-secured attestation protocol; and the remote provisioning computer system coupled with the target computer system, the remote provisioning computer system to remotely provision security policy files and the MAC-based operating system on the target computer system, wherein the remote provisioning of the security files and the MAC-based operating system is performed via a remotely-initiated secure boot process, wherein the remotely provisioning of the security policy files includes remotely transferring the security policy files to the target computer system, wherein the remote provisioning computer to receive the first signed report.

12. The apparatus of claim 11, wherein the remote provisioning computer system is further to remotely provision a MAC-based virtual machine manager (VMM) on the target computer system.

13. The apparatus of claim 11, wherein the plurality of hardware components further includes a chipset to couple the TPM with the processor, and to provide protection to sections of memory from unauthorized input/output (I/O) devices.

14. The apparatus of claim 11, wherein the remote provisioning computer system is coupled with the target computer system via a network comprising at least one of the following: a wide area network, a local area network, and the Internet.

15. A system comprising:
a remote provisioning computer system coupled with a target computer system via a network, the remote provisioning computer system coupled with a first storage medium, the remote provisioning computer system to remotely provision security policy files and a mandatory access control (MAC)-based operating system on the target computer system, wherein the remotely provisioning of the security policy files and the MAC-based operating system is performed via a remotely-initiated secure boot process, wherein the remotely provisioning of the security policy files includes remotely transferring the security policy files to the target computer system, wherein the remote provisioning computer to receive a first cryptographically signed measurement report from the target computer system; and the target computer system having a hardware trusted computing base (TCB) including a plurality of hardware components including a processor and a trusted platform module (TPM), and a hardware storage facility coupled with the TCB, and a chipset, coupled with the TPM and the processor, to provide protection to sections of memory from unauthorized input/output (I/O) devices, the target computer system further having platform credentials associated with the hardware TCB to establish trustworthiness of the hardware TCB, wherein the platform credentials include a private-public key pair having a private key and a public key to perform secure attestation by the hardware TCB, the TCB hardware is further to establish trustworthiness of the MAC-based operating system by measuring identity of the MAC-based operating system, and compile results of the identity measurement into the first cryptographically signed measurement report that is rooted in the trusted platform module (TPM) of the hardware TCB, and submit the first signed report to the remote provisioning computer system via a cryptographically-secured attestation protocol.

16. The system of claim 15, wherein the provisioning computer system is further to remotely provision a MAC-based virtual machine manager (VMM) on the target computer system.

17. The system of claim 15, wherein the network further comprises at least one of the following: a wide area network, a local area network, and an intranet.

18. A machine-readable storage medium comprising instructions which, when executed, cause a machine to:

associate platform credentials to a hardware trusted computing base (TCB) of a target computer system to establish trustworthiness of the hardware TCB, wherein the platform credentials include a private-public key pair having a private key and a public key to perform secure attestation by the hardware TCB; and remotely provision security policy files and a mandatory access control (MAC)-based operating system on the target computer system, wherein the remotely provisioning of the security policy files and the MAC-based operating system is performed via a remotely-initiated secure boot process, wherein the remotely provisioning of the security policy files includes remotely transferring the security policy files to the target computer system, establish trustworthiness of the MAC-based operating system by measuring identity of the MAC-based operating system via the hardware TCB, compile results of the identity measurement into a first cryptographically signed measurement report that is rooted in a trusted platform module (TPM) of the hardware TCB, and submit the first signed report to a remote provisioning computer system via a cryptographically-secured attestation protocol.

19. The machine-readable storage medium of claim 18, wherein the trustworthiness includes the hardware TCB serving as a root of trust for the MAC-based operating system, and having security assurance and trust and security properties including at least one of the following: tamper-resistant secure storage, tamper-resistant software measurement, and tamper-resistant attestation of previously measured values via tamper-resistant signature algorithms.

20. The machine-readable storage medium of claim 18, wherein the instructions which, when executed, further cause the machine to remotely provision a MAC-based virtual machine manager (VMM) on the target computer system.

* * * * *